United States Patent [19]
Tsukamoto et al.

[11] Patent Number: 6,115,512
[45] Date of Patent: Sep. 5, 2000

[54] OPTICAL COLOR SENSOR AND COLOR PRINT INSPECTING APPARATUS

[75] Inventors: Yoshio Tsukamoto, Chigasaki; Akira Kurachi, Tokyo, both of Japan

[73] Assignee: Baldwin-Japan, Ltd., Tokyo, Japan

[21] Appl. No.: 09/197,254

[22] Filed: Nov. 20, 1998

[30] Foreign Application Priority Data

Nov. 22, 1997 [JP] Japan .................................. 9-337771

[51] Int. Cl.$^7$ .............................. H04N 1/46; G06K 7/00
[52] U.S. Cl. ....................... 382/312; 358/505; 358/512; 358/514
[58] Field of Search ......................... 382/312; 358/474, 358/475, 505, 509, 512, 514

[56] References Cited

U.S. PATENT DOCUMENTS

| | | | |
|---|---|---|---|
| 4,812,900 | 3/1989 | Kadowaki | 358/76 |
| 5,075,770 | 12/1991 | Smyth | 358/80 |
| 5,426,290 | 6/1995 | Kawamoto | 250/208.1 |
| 5,642,197 | 6/1997 | Tuhro | 356/418 |
| 5,694,227 | 12/1997 | Starkweather | 358/504 |
| 5,748,828 | 5/1998 | Steiner | 385/146 |
| 5,777,669 | 7/1998 | Uwatoko | 348/308 |

*Primary Examiner*—Jerome Grant, II
*Attorney, Agent, or Firm*—Morgan & Finnegan, LLP

[57] ABSTRACT

There is disclosed an optical color sensor comprising a light source which comprises white LEDs for directing a white light onto a product to be inspected, to directly illuminate the product and generate a reflected light reflected from the product. The optical color sensor further comprises first photo detecting element means spaced from the product. A blue filter is interposed between the first photo detecting element means and the product so that the first photo detecting element means can receive and detect the reflected light passing through the blue filter. The optical color sensor further comprises second photo detecting element means spaced from the product. A red filter is interposed between the second photo detecting element means and the product so that the second photo detecting element means can receive and detect the reflected light passing through the red filter. The first and second photo detecting element means are arranged to receive and detect the reflected light reflected from the product at substantially the same position in a region onto which the white LEDs direct the white light.

3 Claims, 9 Drawing Sheets

CORRECTION VALUE

| | CYAN | MAGENTA | YELLOW |
|---|---|---|---|
| BLUE FILTER | 0.7 | 0.5 | 0 |
| RED FILTER | 0 | 1.0 | 1.0 |

FIG.14

OPTICAL COLOR SENSOR AND COLOR PRINT INSPECTING APPARATUS

BACKGROUND OF THE INVENTION

1. Field of the Invention

The invention relates to an optical color sensor. In particular, the invention relates to an apparatus utilizing the optical color sensor for inspecting a color print on a printed product such as a news paper.

2. Description of Related Art

There has been proposed an apparatus for inspecting a color print on a printed product, as disclosed in Japanese Laid-Open Patent Publication No. 156,080 of 1997. The printed product is color printed with four color inks of yellow, cyan, magenta and black. In this connection, the apparatus includes two light sources one of which comprises blue LEDs for directing a blue light onto the printed product to directly illuminate the printed product with the blue light. The other light source comprises red LEDs for directing a red light onto the printed product to directly illuminate the printed product with the red light. The apparatus further includes a photo diode array for receiving and detecting a reflected light reflected from the printed product. The light sources are selectively and alternately energized by a switching circuit to read out the color print on the printed product. For example, the blue LEDs are energized by the switching circuit to direct the blue light onto the printed product. The photo diode array receives and detects the reflected light reflected from the printed product to read out and inspect the color print of yellow, magenta and black. The red LEDs are then energized to direct the red light onto the printed product. The photo diode array receives and detects the reflected light reflected from the printed product to read out and inspect the color print of cyan and black.

By the way, it is desired to achieve a more and more high productivity without lowering a quality, in the color printing industry. Accordingly, it is required to quickly and reliably inspect the color print of each color and determine it to be good or no good. However, in the apparatus, the light sources have to be selectively and alternately energized to read out and inspect the color print of each color. A switching time is required whenever the light sources are selectively and alternately energized. It also takes a certain time to provide a stable amount of light after switching. Accordingly, the apparatus can not quickly and reliably inspect the color print of each color to meet the requirement of high productivity and high quality.

It is therefore an object of the invention to provide a new and improved optical color sensor, to overcome the above problem.

Other object of the invention is to provide an apparatus utilizing the optical color sensor for inspecting a color print on a printed product.

Other object of the invention is to quickly and reliably inspect the color print of each color and determine it to be good or no good.

3. Summary of the Invention

According to the invention, there is provided an optical color sensor. The optical color sensor comprises a light source which comprises white LEDs for directing a white light onto a product to be inspected, to directly illuminate the product with the white light and generate a reflected light reflected from the product. The optical color sensor further comprises first photo detecting element means spaced from the product. A blue filter is interposed between the first photo detecting element means and the product so that the first photo detecting element means can receive and detect the reflected light passing through the blue filter. The optical color sensor further comprises second photo detecting element means spaced from the product. A red filter is interposed between the second photo detecting element means and the product so that the second photo detecting element means can receive and detect the reflected light passing through the red filter. The first and second photo detecting element means are arranged to receive and detect the reflected light reflected from the product at substantially the same position in a region onto which the white LEDs direct the white light to directly illuminate the product.

In a preferred embodiment, the blue filter causes the reflected light having a wave length of nearly 450 nm to pass therethrough, while the red filter causes the reflected light having a wave length of nearly 650 nm to pass therethrough.

The white LEDs are disposed between the first and second photo detecting element means.

There is also provided an apparatus for inspecting a color print on a printed product which is fed in a direction. The apparatus comprises a color print reading head which comprises a plurality of optical color sensors arranged in line in a direction vertical to the feeding direction of the printed product for reading out the color print on the printed product. The optical color sensors each comprises a light source which comprises white LEDs for directing a white light onto the printed product, to directly illuminate the printed product with the white light and generate a reflected light reflected from the printed product. The optical color sensor further comprises first photo detecting element means spaced from the printed product. A blue filter is interposed between the first photo detecting element means and the printed product so that the first photo detecting element means can receive and detect the reflected light passing through the blue filter to read out the color print on the printed product. The optical color sensor further comprises second photo detecting element means spaced from the printed product. A red filter is interposed between the second photo detecting element means and the printed product so that the second photo detecting element means can receive and detect the reflected light passing through the red filter to read out the color print on the printed product. The first and second photo detecting element means are arranged to receive and detect the reflected light reflected from the printed product at substantially the same position in a region onto which the white LEDs direct the white light to directly illuminate the printed product.

The apparatus may further comprise reference data memory means for storing the read out data transmitted from the reading head as reference data. The apparatus may further comprise color print data memory means for storing the read out data transmitted from the reading head as color print data. The apparatus may further comprise comparing and evaluating means for comparing the color print data transmitted from the color print data memory means with the reference data transmitted from the reference data memory means to evaluate the difference between the color print data and the reference data obtained by the reflected light passing through the blue filters of the optical color sensors, as a first evaluated value, and evaluate the difference between the color print data and the reference data obtained by the reflected light passing through the red filters of the optical color sensors, as a second evaluated value. The apparatus may further comprise first flag establishing means for comparing the first evaluated value with a warning tolerance predetermined with respect to the reference data for each color to establish a good or no good flag for each color, and comparing the first evaluated value with a warning reference value which is the warning tolerance multiplied by a correction value for each color, to establish a good or no good flag for each color. The apparatus may further comprise second flag establishing means for comparing the second evaluated value with a warning tolerance predetermined with respect to the reference data for each color to establish a good or no good flag for each color. The apparatus may further comprise determining means for determining the color print of each color to be good or no good in accordance with the result of comparison of the second evaluated value with the warning tolerance and the good or no good flags to generate an output signal indicating the determination.

DETAILED DESCRIPTION OF THE PREFERRED EMBODIMENTS

Figure 1:
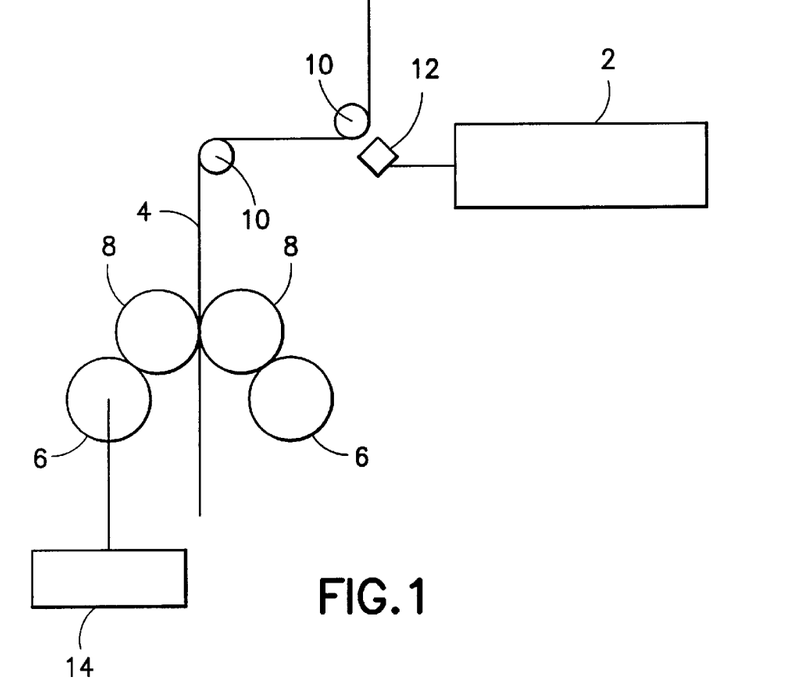
FIG. 1 is a schematically side view of a preferred embodiment of the invention.

Turning now to the drawings, FIG. 1 illustrates an apparatus 2 for inspecting a color print on a printed product 4. The printed product 4 comprises a news paper which is color printed by a printing unit including plate cylinders 6 and blanket cylinders 8. The printed product 4 is then fed in a direction through guide rollers 10.

The apparatus 2 includes a color reading head 12 extending along the guide roller 10. The reading head 12 may be disposed in a position other than the position of the guide roller 10. An encoder 14 is connected to the plate cylinder 6 to generate pulses in accordance with the rotation of the plate cylinder 6. The reading head 12 is arranged to read out the color print on the printed product 4 in response to the pulses from the encoder 14. The encoder 14 may be connected to the blanket cylinder 8 or guide roller 10 to generate pulses in accordance with the rotation of the blanket cylinder 8 or guide roller 10.

Figure 2:
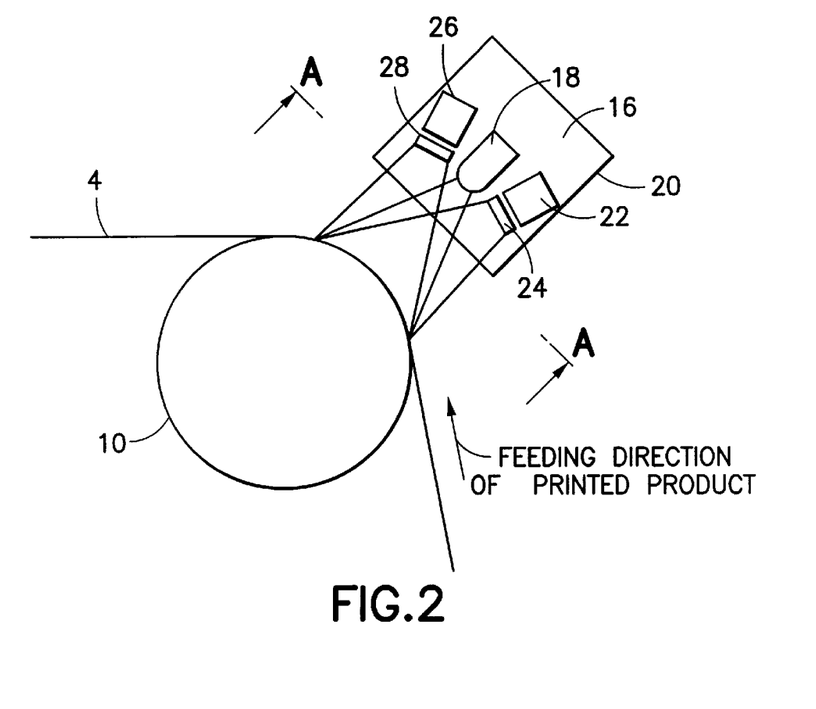
FIG. 2 is an enlarged view of the optical color sensor in FIG. 1.
Figure 3:
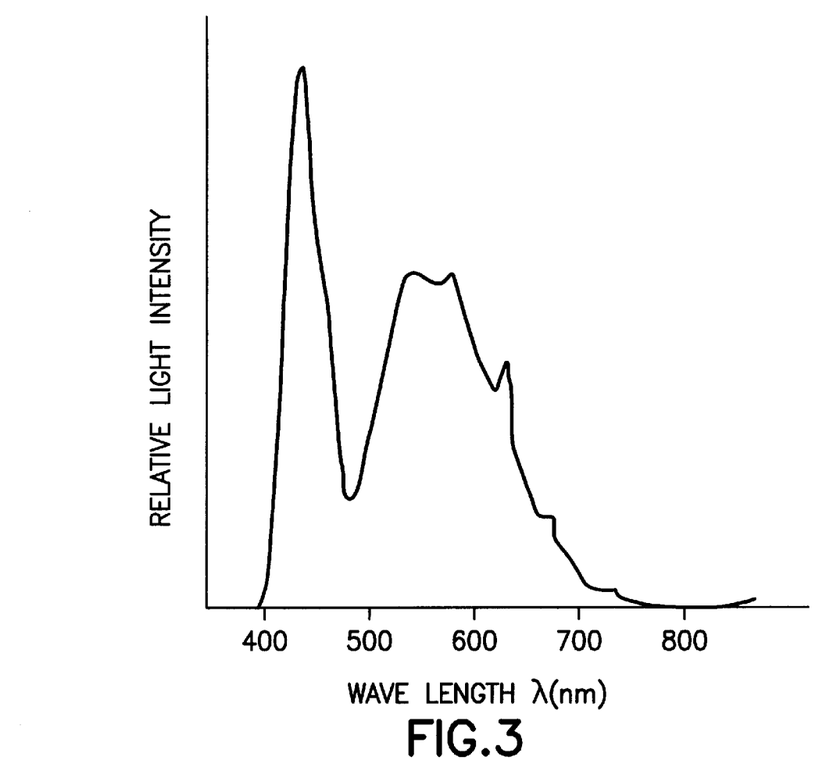
FIG. 3 is a graph showing the characteristic of the white LEDs in FIG. 2.
Figure 4:
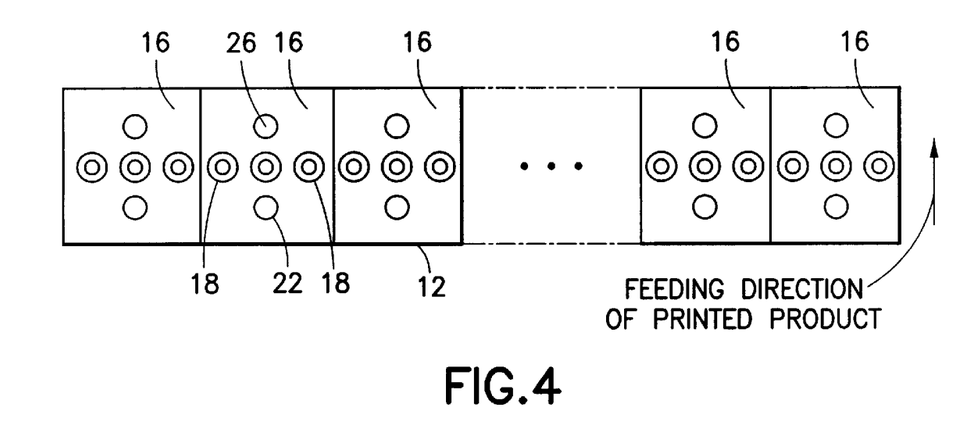
FIG. 4 is a bottom view of the optical color sensor seen in a direction of arrows A and A in FIG. 2.

The reading head 12 comprises a plurality of optical color sensors 16 arranged in line in a direction vertical to the feeding direction of the printed product 4 for reading out the color print on the printed product 4, as shown in FIG. 2 and FIG. 4. It should be noted that the reading head 12 has a length to cover at least the portion of width of the color print on the printed product 4 to be inspected. The optical color sensors 16 each includes a light source which comprises white LEDs 18 attached to a casing 20 for directing a white light onto the printed product 4, to directly illuminate the printed product 4 with the white light and generate a reflected light reflected from the printed product 4. In the embodiment, the optical color sensors 16 each includes three LEDs 18 arranged in line in the arranging direction of the optical color sensors 16. The white LEDs 18 have a peak of light intensity at a wave length of nearly 450 nm, as shown in FIG. 3.

The optical color sensor 16 further includes first photo detecting element means 22 and a blue filter 24 attached to the casing 20. The first photo detecting element means comprises a first photo transistor 22 spaced from the printed product 4. The blue filter 24 is interposed between the first photo transistor 22 and the printed product 4 so that the first photo transistor 22 can receive and detect the reflected light passing through the blue filter 24 to read out the color print on the printed product 4. The optical color sensor 16 further includes second photo detecting element means 26 and a red filter 28 attached to the casing 20. The second photo detecting element means comprises a second photo transistor 26 spaced from the printed product 4. The red filter 28 is interposed between the second photo transistor 26 and the printed product 4 so that the second photo transistor 26 can receive and detect the reflected light passing through the red filter 28 to read out the color print on the printed product 4.

In the embodiment, the first photo transistor 22 and the blue filter 24 are positioned upstream of the white LEDs 18 in the feeding direction of the printed product 4, the second photo transistor 26 and the red filter 28 being positioned downstream of the white LEDs 18 in the feeding direction of the printed product 4, so that the white LEDs 18 are disposed between the first and second photo transistors 22 and 26. The first and second photo transistors 22 and 26 are arranged to receive and detect the reflected light reflected from the printed product 4 at substantially the same position in a region onto which the white LEDs 18 direct the white light to directly illuminate the printed product 4. The first and second photo transistors 22 and 26 are inclined symmetrically to extend toward a point of intersection between the printed product 4 and a normal thereto which extends through the white LEDs 18 so that the first and second photo transistors 22 and 26 can effectively receive and detect the reflected light.

Figure 5:
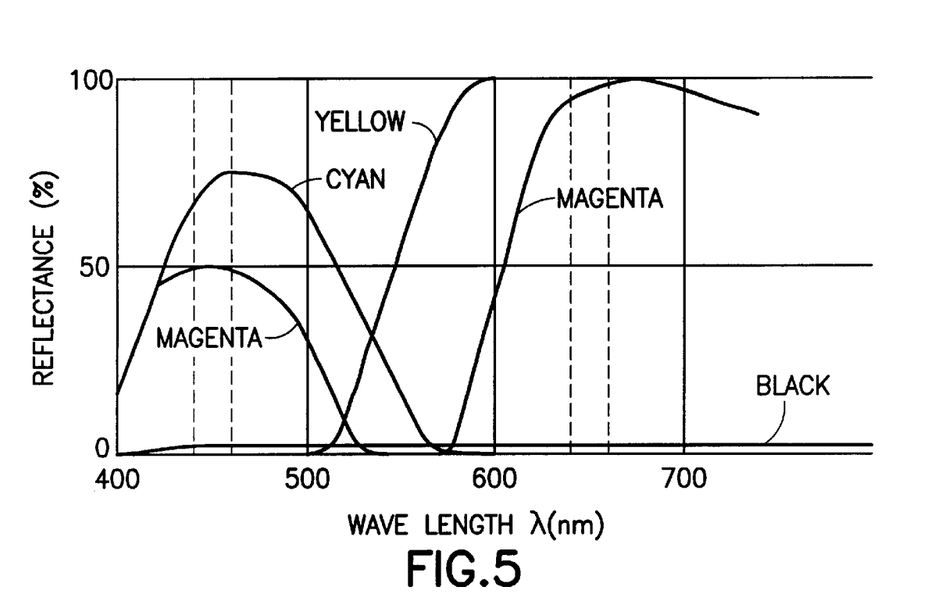
FIG. 5 is a graph showing the relation of reflectance to wave length of each color.
Figure 6:
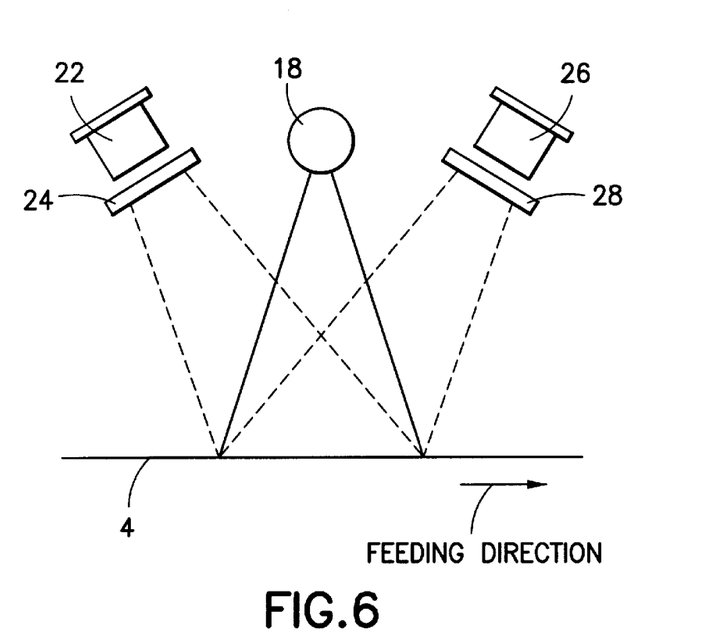
FIG. 6 is an explanatory view of the optical color sensor in FIG. 1.

The printed product 4 is color printed with four color inks of yellow, cyan, magenta and black. The colors present reflectances different from each other with respect to the wave length of white light, as shown in FIG. 5. Yellow presents no reflectance at a wave length of nearly 450 nm. However, yellow presents an increasing reflectance in a range of wave length of 500 to 600 nm and a high reflectance at a wave length of over 600 nm. Cyan presents a reflectance of over 50% in a range of wave length of about 450 nm to about 550 nm, a low reflectance at other wave length and no reflectance at a wave length of nearly 650 nm. Magenta presents a reflectance of nearly 50% at a wave length of nearly 450 nm and a high reflectance at a wave length of nearly and over 650 nm. Black presents a low reflectance throughout the range of wave length.

On the other hand, the blue filter 24 causes the reflected light having a wave length of nearly 450 nm to pass therethrough. The red filter 28 causes the reflected light having a wave length of nearly 650 nm to pass therethrough. Accordingly, as to the reflected light reflected by the color print of cyan, it passes not through the red filter 28 but through the blue filter 24. The first photo transistor 22 receives and detects the reflected light passing through the blue filter 24 to read out the color print of cyan. Conversely, as to the reflected light reflected by the color print of yellow, it passes not through the blue filter 24 but through the red filter 28. The second photo transistor 26 receives and detects the reflected light passing through the red filter 28 to read out the color print of yellow.

In addition, as to the reflected light reflected by the color print of magenta, it passes through both of the filters 24 and 28. The first and second photo transistors 22 and 26 receive and detect the reflected light passing through the blue and red filters 24 and 28. The photo transistor has a sensitivity which is three times at a wave length of nearly 650 nm as high as at a wave length of nearly 450 nm, in compensation for the light intensity of white LEDs shown in FIG. 3 which is less at the wave length of nearly 650 nm than at the wave length of nearly 450 nm. Accordingly, the first and second photo transistors 22 and 26 can detect the reflected light at the same level of signal. The optical color sensors 16 can therefore read out the color print of magenta.

Accordingly, in the apparatus, the reading head 12 can read out the color print of each color. The apparatus merely has to include a light source comprising the white LEDs 18 and first and second photo detecting element means 22 and 26, to be miniaturized and simplified. It can be especially miniaturized and simplified by the white LEDs 18 disposed between the first and second photo detecting element means 22 and 26.

In addition, unlike the the blue and red LEDs selectively and alternately energized by the switching circuit disclosed in Japanese Laid-Open Patent Publication No. 156,080 of 1997, the white LEDs 18 can be continuously lighted to read out the color print of each color, without the switching circuit involving a complicated arrangement, to be simplified. The maintenance is also easy. The apparatus can read out the color print of yellow, cyan, magenta and black with the white LEDs 18 continuously lighted, to quickly and reliably inspect the color print of each color and determine it to be good or no good. This can meet the requirement of high productivity and high quality in the color printing industry.

In the embodiment, the apparatus is arranged to firstly store the read out data transmitted from the reading head 12 as reference data. The reading head 12 then read out the color print of the printed product 4 again and again. The apparatus stores the read out data transmitted from the reading head 12 as color print data, whenever reading out the color print.

Figure 7:
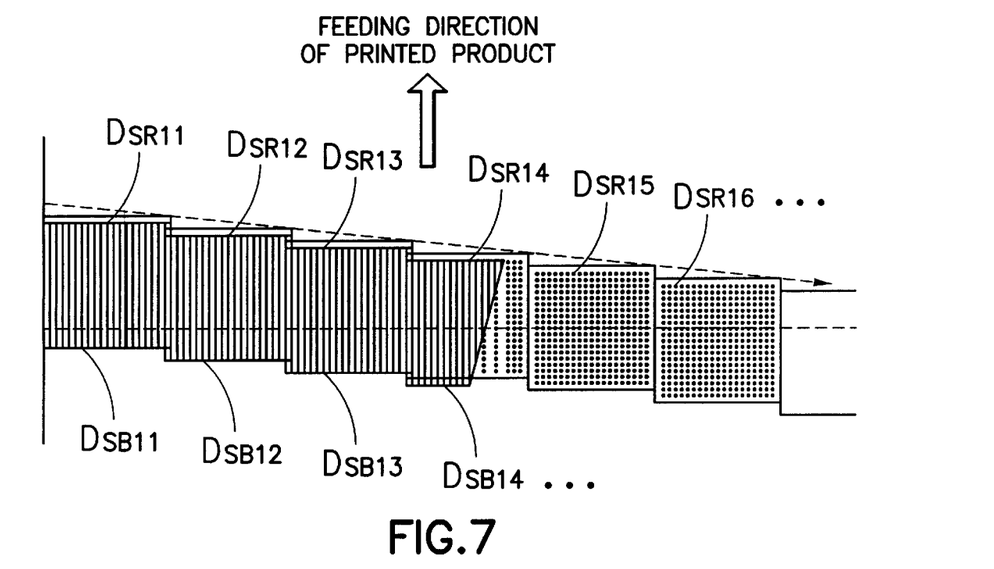
FIG. 7 is an explanatory view of how to read out for reference data.
Figure 8:
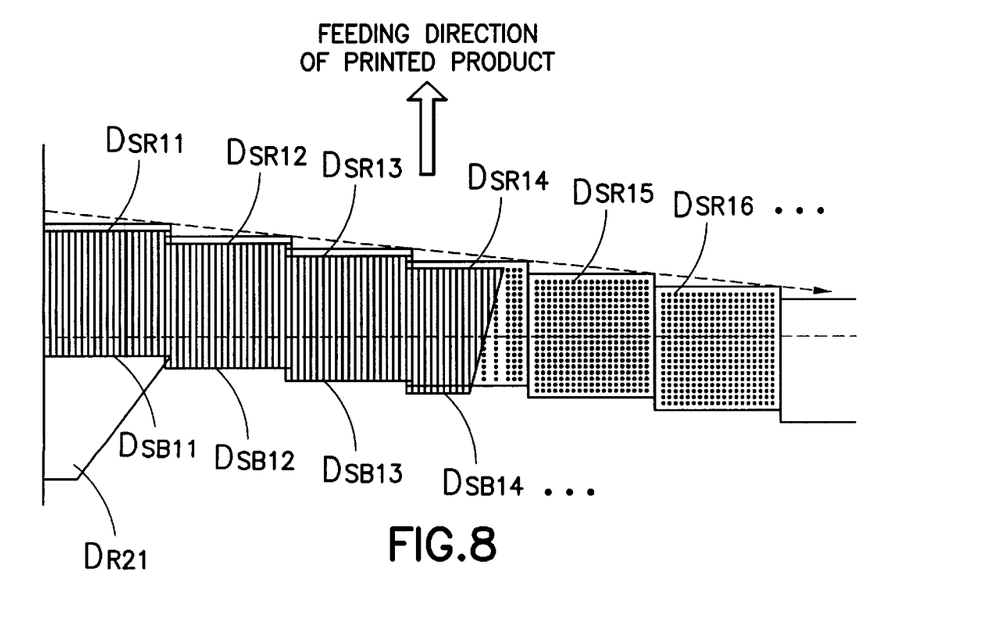
FIG. 8 is an explanatory view of how to read out for color print data.

In the reading head, the optical color sensors 16 function one by one to scan and read out the color print on the printed product 4 so that the read out data DSR11, DSB11, DSR12, DSB12 - - - DSR1N, DSB1N are obtained one by one as the reference data, as shown in FIG. 7. The read out data DR11, DB11, DR12, DB12 - - - DRIN, DBIN are also obtained one by one as the color print data, as shown in FIG. 8. In each of the optical color sensors 16, the reference data DSB11, DSB12 DSB1N are firstly obtained by the first photo transistor 22 and the blue filter 24, the reference data DSR11, DSR12 - - - DSR1N being then obtained by the second photo transistor 26 and the red filter 28. In addition, the color print data DB11, DB12 - - - DB1N are firstly obtained by the first photo transistor 22 and the blue filter 24, the color print data DR11, DR12 - - - DR1N being then obtained by the second photo transistor 26 and the red filter 28.

Figure 9:
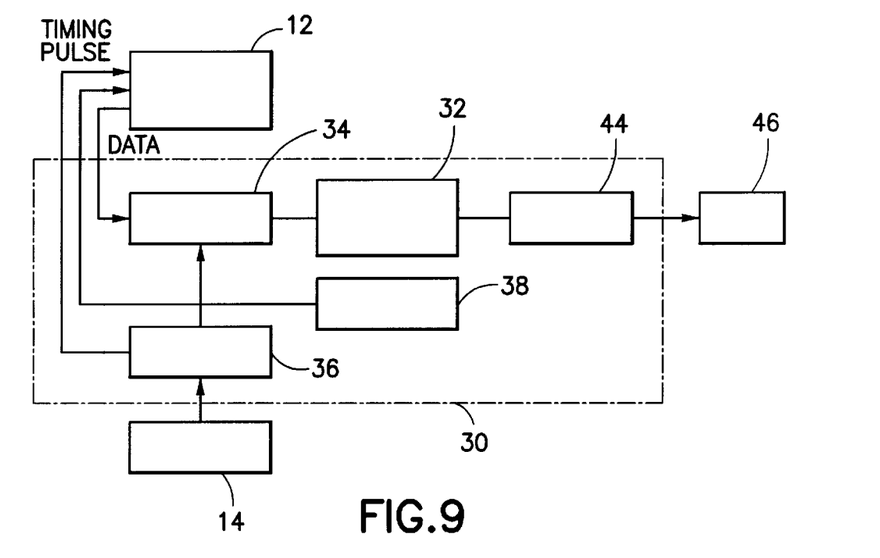
FIG. 9 is a block diagram of the elements in the apparatus in FIG. 1.

The apparatus further includes reference data memory means for storing the read out data transmitted from the reading head 12 as reference data. The apparatus further includes color print data memory means for storing the read out data transmitted from the reading head 12 as color print data. In the embodiment, the apparatus has a control unit 30 including a data memory portion 32, as shown in FIG. 9, which includes the reference data memory means and the color print data memory means.

Figure 10:
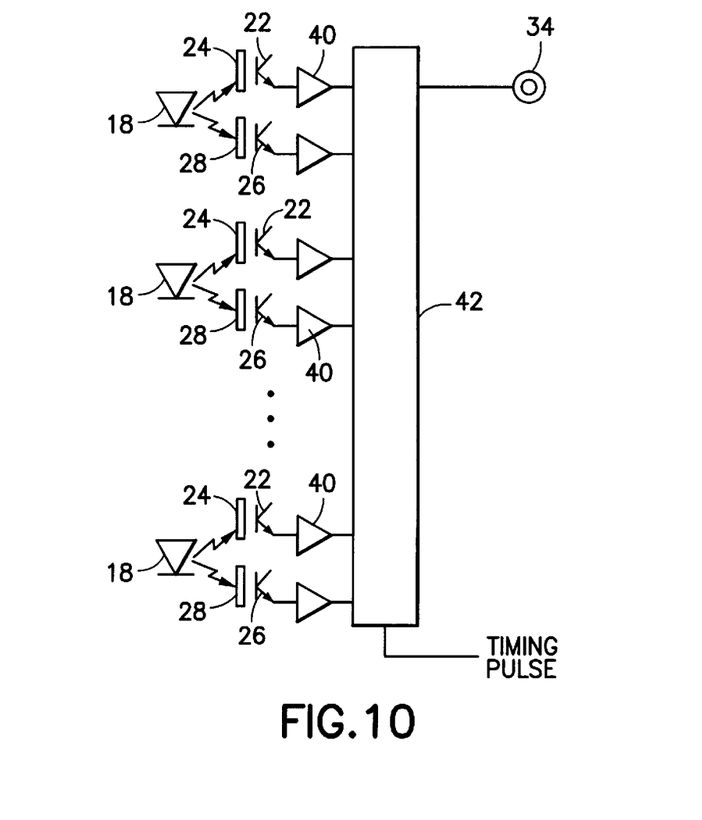
FIG. 10 is a block diagram of the reading head in FIG. 9.

The control unit 30 further includes an A-D converter 34, a pulse modulating circuit 36 and a power source 38. The pulse modulating circuit 36 feeds timing pulses to the reading head 12 in response to the pulses from the encoder 14, to read out the color print on the printed product 4. The power source 38 feeds a power to the LEDs 18 to light the LEDs 18 in each of the optical color sensor 14. The first or second photo transistor 22, 26 then reads out the color print on the printed product 4. The read out data are transmitted one by one to the A-D converter 34 from the reading head 12 which includes amplifiers 40 and a gate circuit 42, as shown in FIG. 10. The read out data are amplified by the amplifiers 40 and transmitted to the A-D converter 34 through the gate circuit 42 which is turn on by the timing pulses input from the pulse modulating circuit 36.

The read out data are then converted into digital values by the A-D converter 34. The data memory portion 32 stores the converted data as the reference data and the color print data. The A-D converter 34 comprises high speed operational tips and starts to receive the read out data obtained by the first photo transistor 22 in response to timing pulses input from the pulse modulating circuit 36. The read out data is converted into digital values and written to the data memory portion 32. The A-D converter 34 then receives the read out data obtained by the second photo transistor 26 so that the read out data is converted into digital values and written to the data memory portion 32. The A-D converter 34 is controlled by the timing pulses to receive the read out data obtained by each optical color sensor 16. The data memory portion 32 stores the reference data and the color print data obtained by all the optical color sensors 16.

The apparatus further includes comparing and evaluating means for comparing the color print data transmitted from the data memory portion 32 with the reference data transmitted from the data memory portion 32 to evaluate the difference between the color print data and the reference data. In the embodiment, the control unit 30 further includes an operational portion 44 constituting the comparing and evaluating means.

Figure 11:
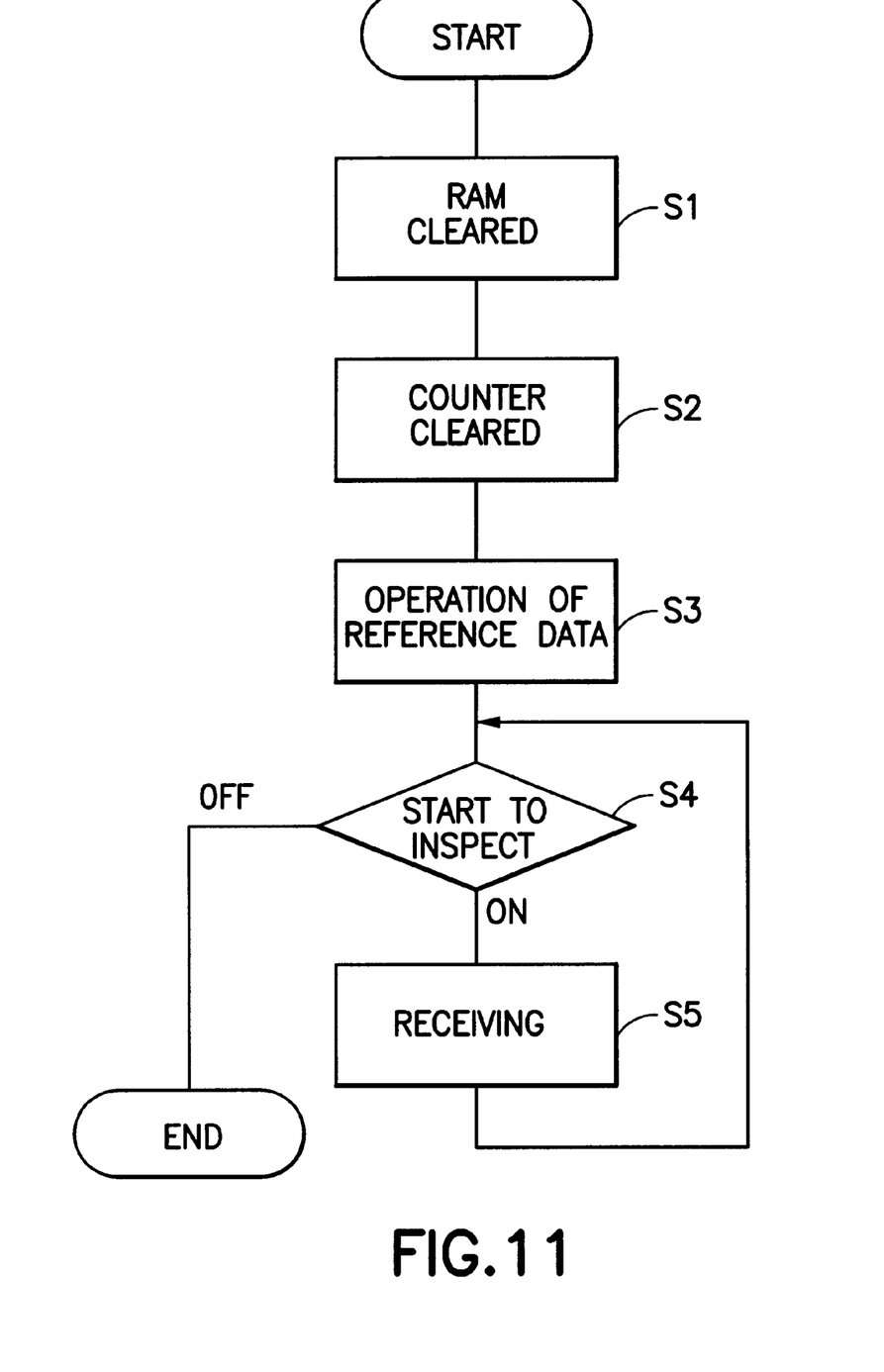
FIG. 11 is a flow chart of comparing and evaluating in the operational portion in FIG. 9.

In the operational portion 44, preparatory to the procession of the reference data and the color print data, a RAM and a counter are cleared (S1, S2) to start the operation of the reference data (S3) written in the data memory portion 32, as shown in FIG. 11. The counter includes an M counter for counting M data obtained by M optical color sensors 16 in the reading head 12. The counter further includes an N counter for counting a number of times to receive the M data. The RAM stores the result of operation of the reference data. An instruction is automatically given to start inspection when starting to print (S4). The operational portion 44 then receives the color print data transmitted from the data memory portion 32 in response to the instruction (S5) and compares it with the reference data to evaluate the difference between the color print data and the reference data. This can inspect the color print on the printed product about contamination and tonality and determine it to be good or no good.

Figure 12:
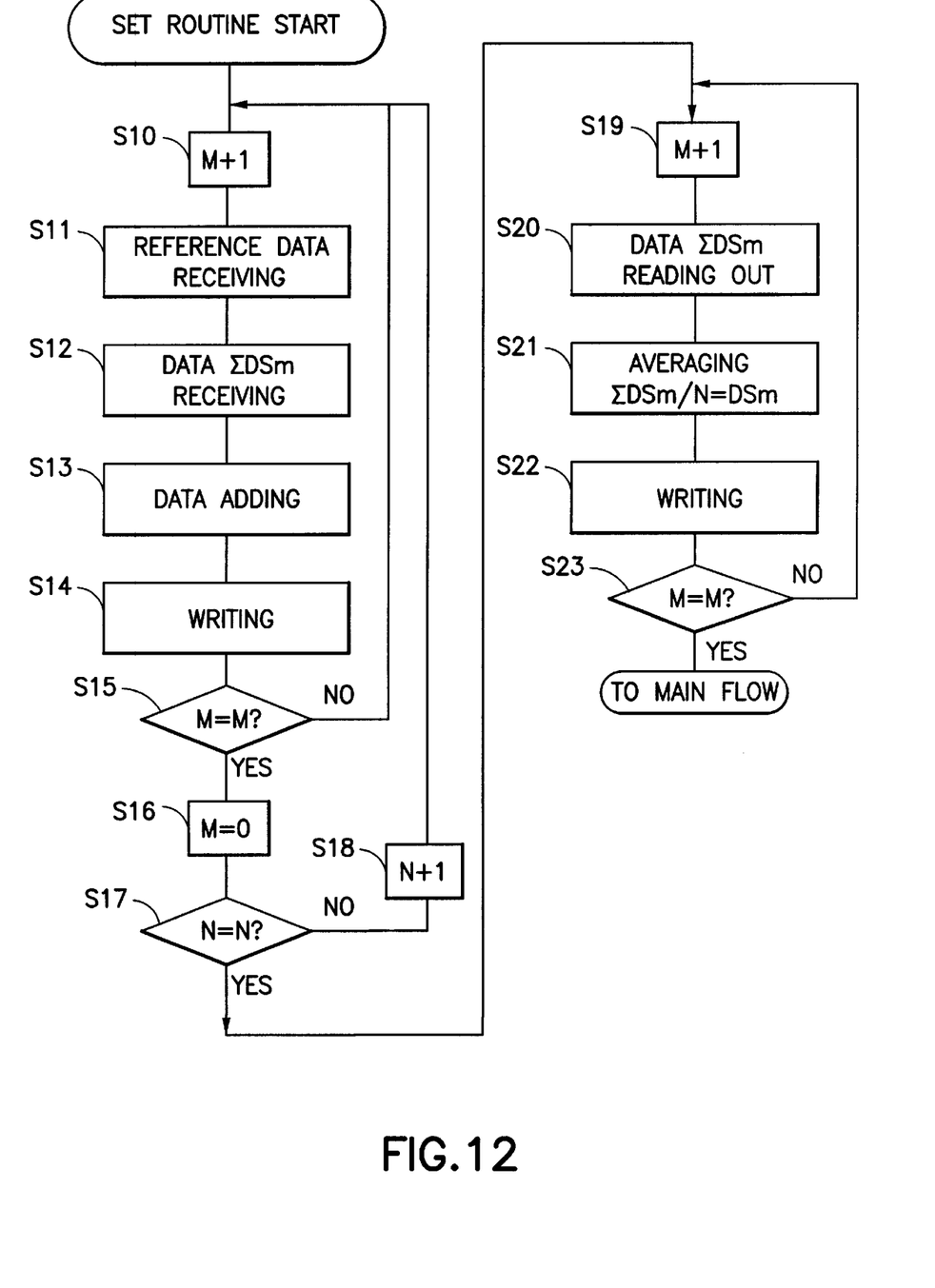
FIG. 12 is a flow chart of comparing and evaluating for the reference data.

As to the operation of the reference data, the operational portion 44 is arranged to receive the M data obtained by M optical color sensors 16 N times and write the mean values thereof to the RAM of a reference data area as the reference data DS1 to DSm. The M counter is set to +1 when starting the reference data set routine (S10), as shown in FIG. 12. The operational portion 44 receives first reference data (S11) and receives data ΣDSm of the reference data area (S12). It then adds the reference data and the data ΣDSm (S13) and write the sum to the reference data area (S14). The steps S1 to S14 are repeated by M counter incremented by +1 one by one. It is confirmed that the operational portion 44 has received the read out data obtained by all the optical color sensors 16 (M=M) (S15). The M counter is reset to "0" when receiving all the read out data (S16). The N counter is then set to +1 (S18). The operational portion 44 adds the first reference data and second reference data, utilizing the sum to update the preceding data. Such the processes are repeated N times to add the M data obtained by each optical color sensor 16 N times. The N additions (N=N) are confirmed by the N counter to proceed to steps for evaluating a mean value of the reference data (S17).

The M counter is set to +1 (S19) to evaluate the mean value of the reference data. The operational portion 44 reads out the data ΣDSm of the reference data area (S20), evaluates the mean value DSm (=ΣDSm/N) (S21) and write it to the reference data area (S22). It is confirmed that the steps S19 to S22 has been accomplished M times (M=M) (S23) to average the reference data obtained by all the optical color sensors 16. It then returns to the main flow.

Figure 13:
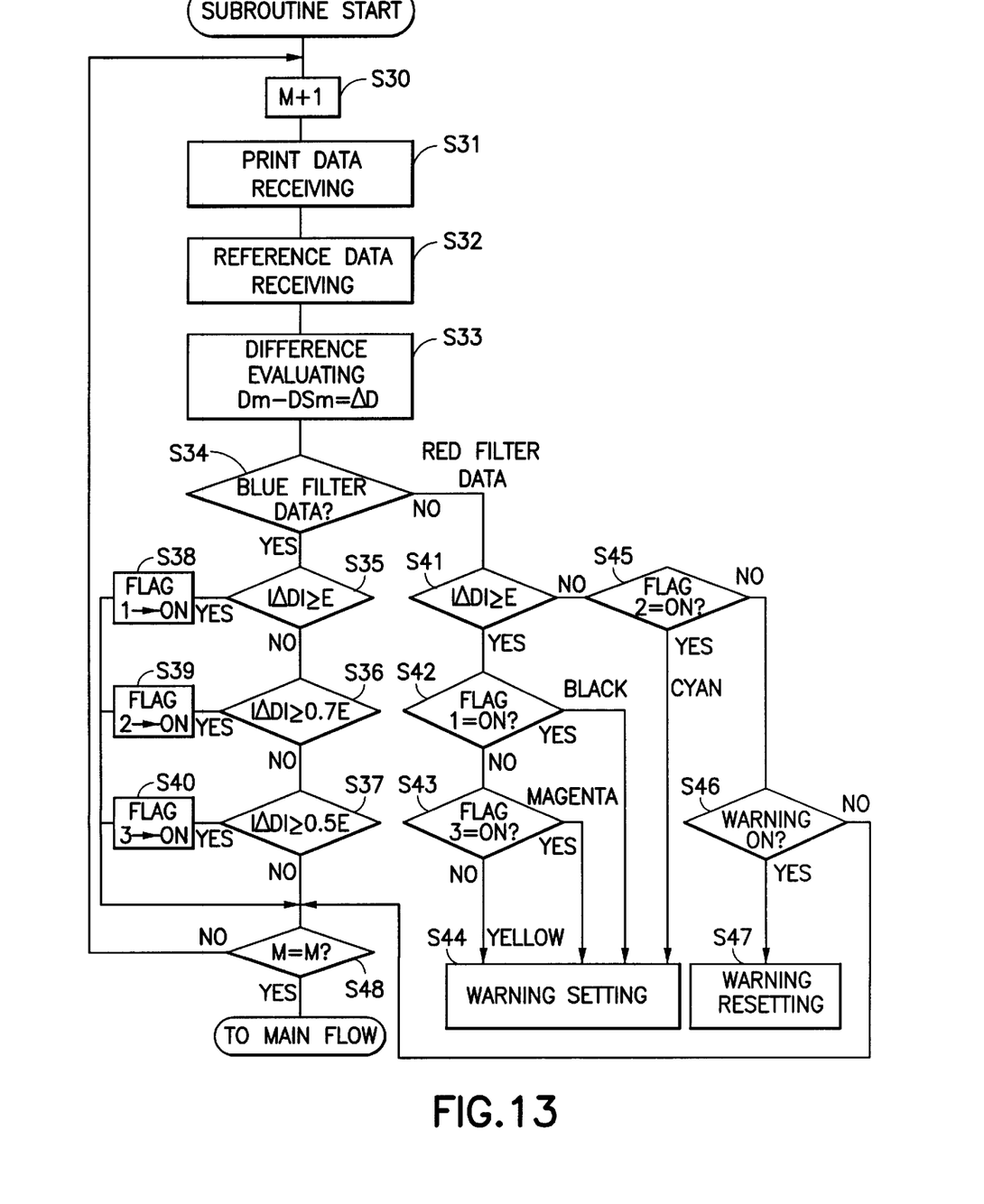
FIG. 13 is a flow chart of comparing and evaluating for the color print data.

As to the reception of the color print data, the operational portion 44 receives the M data (D1 to Dm) obtained by all the optical color sensors 16 and compare it with the reference data (DS1 to DSm). It then evaluates the difference between the color print data and the reference data for warning if the difference exceeds a range E of contamination.

In this connection, the operational portion 44 is arranged to evaluate the difference between the color print data and the reference data obtained by the reflected light passing through the blue filter 24 of the optical color sensor 16, as a first evaluated value. The operational portion 44 further evaluates the difference between the color print data and the reference data obtained by the reflected light passing through the red filter 28 of the optical color sensor 16, as a second evaluated value.

In addition, the operational portion 44 includes first flag establishing means for comparing the first evaluated value with a warning tolerance predetermined with respect to the reference data for each color to establish a good or no good flag for each color, and comparing the first evaluated value with a warning reference value which is the warning tolerance multiplied by a correction value for each color, to establish a good or no good flag for each color. The operational portion 44 further includes second flag establishing means for comparing the second evaluated value with a warning tolerance predetermined with respect to the reference data for each color to establish a good or no good flag for each color.

The operational portion 44 further includes determining means for determining the color print of each color to be good or no good in accordance with the result of comparison of the second evaluated value with the warning tolerance and the good or no good flags to generate an output signal indicating the determination. The apparatus includes an output portion 46 for warning in response to the output signal transmitted from operational portion 44.

In the embodiment, the M counter is set to +1 (S30), as shown in FIG. 13. The operational portion 44 then receives the color print data Dm and the reference data DSm of the reference data area (S31, S32) to evaluate the differences ΔD (=Dm−DSm) between the color print data and the reference data, that is, an amount in increase or decrease of the tonality and contamination (S33). It recognizes which of the blue filter 24 and the red filter 28 the color print data are obtained by (S34).

The range E is a standard for tonality (e.g., the range of about 5 to 10% in value of the reference data). In the case of the color print data obtained by the blue filter 24, a warning flag 1 is turned to ON (S38) when the absolute value of ΔD is more than E (S35). A warning flag 2 is turned to ON (S39) when the absolute value of ΔD is more than 0.7 E and less than E (S36). A warning flag 3 is turned to ON (S40) when the absolute value of ΔD is more than 0.5 E and less than 0.7 E (S37). The operational portion 44 recognizes the state of the M counter when the absolute value of ΔD is less than 0.5 E (S48). If it is not M=M, the M counter is incremented by +1, the steps S31 to S40 being repeated to establish a good or no good flags for all the color print data which the operational portion 44 has received.

In the case of the color print data obtained by the red filter 28, the operational portion 44 recognizes the state of the warning flag 1 (S42) when the absolute value of ΔD is more than E (S41). It sets a warning to indicate a faulty black when the warning flag 1 is ON (S44). The operational portion 44 recognizes the state of the warning flag 3 (S43) when the warning flag 1 is not ON. It sets a warning to indicate a faulty magenta when the warning flag 3 is ON (S44), and sets a warning to indicate a faulty yellow when the warning flag 3 is not ON (S44). Returning to step S41, the operational portion 44 recognizes the state of the warning flag 2 (S45) if the absolute value ΔD is less than E. It sets a warning to indicate a faulty cyan when the warning flag 2 is ON (S44). It is confirmed by the operational portion 44 whether it warns or not (S46) when the warning flag 2 is not ON, resetting if warning (warning ON) (S47). It recognizes the state of the M counter if not warning (S48).

It is confirmed by the operational portion 44 at step 48 that it checks all the M data for tonality and contamination, then returning to the main flow.

Figure 14:
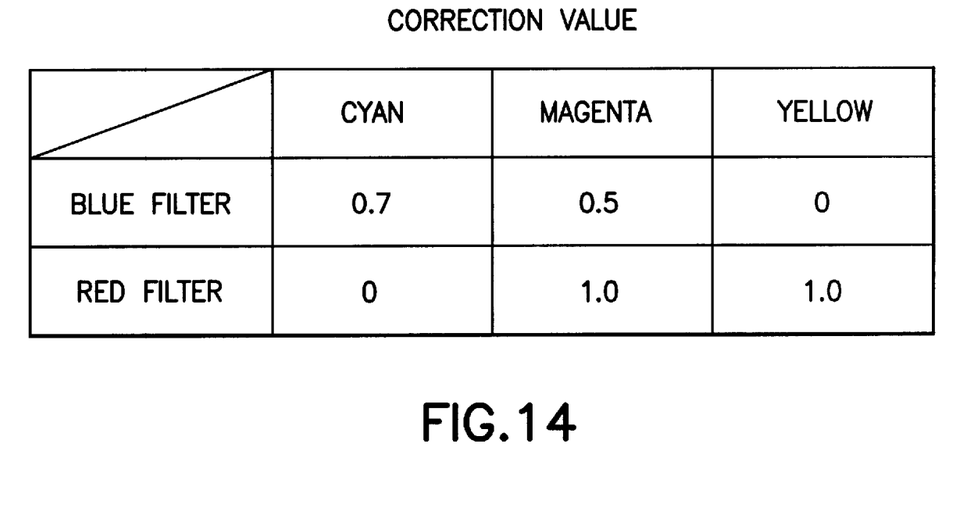
FIG. 14 is a table of the correction value for each color.

Correction values are shown in FIG. 14 for each color. It should be noted that the correction values of "0.7" and "0.5" are contained in the steps S36 and S37. The correction values are calculated in accordance with the spectral properties of the colors, respectively. They can be seen from values of 0.7 or 0.5 obtained by the light passing through different filters with respect to the same change in tonality of 1.0. The correction values in FIG. 14 are obtained by the blue filter which causes the light having a wave length of nearly 450 nm to pass through, and the red filter which causes the light having a wave length of nearly 650 nm to pass through.

What is claimed is:

1. An optical color sensor comprising:
   a light source which comprises while LEDs for directing a white light onto a product to be inspected, to directly illuminate the product with the white light and generate a reflected light reflected from the product;
   first photo detecting element means spaced from said product;

a blue filter interposed between said first photo detecting element means and said product so that said first photo detecting element means can receive and detect the reflected light passing through said blue filter;

second photo detecting element means spaced from said product; and a red filter interposed between said second photo detecting element means and said product so that said second photo detecting element means can receive and detect the reflected light passing through said red filter, said first and second photo detecting element means being arranged to receive and detect the reflected light reflected from said product at substantially the same position in a region onto which said white LEDs direct the white light to directly illuminate said product, wherein said white LEDs are disposed between said first and second photo detecting element means.

2. An apparatus for inspecting a color print on a printed product which is fed in a direction, said apparatus comprising a color print reading head which comprises a plurality of optical color sensors arranged in line in a direction vertical to the feeding direction of said printed product for reading out the color print on the printed product, said optical color sensors each comprising:

a light source which comprises white LEDs for directing a white light onto the printed product, to directly illuminate the printed product with the white light and generate a reflected light reflected from the printed product;

first photo detecting element means spaced from the printed product;

a blue filter interposed between said first photo detecting element means and the printed product so that said first photo detecting element means can receive and detect the reflected light passing through said blue filter to read out the color print on the printed product;

second photo detecting element means spaced from the printed product; and a red filter interposed between said second photo detecting element means and the printed product so that said second photo detecting element means can receive and detect the reflected light passing through said red filter to read out the color print on the printed product, said first and second photo detecting element means being arranged to receive and detect the reflected light reflected from the printed product at substantially the same position in a region onto which said white LEDs direct the white light to directly illuminate said printed product, said apparatus further comprising:

reference data memory means for storing the read out data transmitted from said reading head as reference data;

color print data memory means for storing the read out data transmitted from said reading head as color print data;

comparing and evaluating means for comparing said color print data transmitted from said color print data memory means with said reference data transmitted from said reference data memory means to evaluate the difference between said color print data and said reference data obtained by the reflected light passing through said blue filters of said optical color sensors, as a first evaluated value, and evaluate the difference between said color print data and said reference data obtained by the reflected light passing through said red filters of said optical color sensors, as a second evaluated value;

first flag establishing means for comparing said first evaluated value with a warning tolerance predetermined with respect to said reference data for each color to establish a good or no good flag for each color, and comparing said first evaluated value with a warning reference value which is the warning tolerance multiplied by a correction value for each color, to establish a good or no good flag for each color;

second flag establishing means for comparing said second evaluated value with a warning tolerance predetermined with respect to said reference data for each color to establish a good or no good flag for each color; and determining means for determining the color print of each color to be good or no good in accordance with the result of comparison of said second evaluated value with said warning tolerance and said good or no good flags to generate an output signal indicating the determination.

3. An apparatus for inspecting a color print on a printed product which is fed in a direction, said apparatus comprising a color print reading head which comprises a plurality of optical color sensors arranged in line in a direction vertical to the feeding direction of said printed product for reading out the color print on the printed product, said optical color sensors each comprising:

a light source which comprises white LEDs for directing a white light onto the printed product, to directly illuminate the printed product with the white light and generate a reflected light reflected from the printed product;

first photo detecting element means spaced from the printed product;

a blue filter interposed between said first photo detecting element means and the printed product so that said first photo detecting element means can receive and detect the reflected light passing through said blue filter to read out the color print on the printed product;

second photo detecting element means spaced from the printed product; and a red filter interposed between said second photo detecting element means and the printed product so that said second photo detecting element means can receive and detect the reflected light passing through said red filter to read out the color print on the printed product, said first and second photo detecting element means being arranged to receive and detect the reflected light reflected from the printed product at substantially the same position in a region onto which said white LEDs direct the white light to directly illuminate said printed product, wherein said white LEDs are disposed between said first and second photo detecting element means.

* * * * *

UNITED STATES PATENT AND TRADEMARK OFFICE
CERTIFICATE OF CORRECTION

PATENT NO. : 6,115,512

DATED : September 5, 2000

INVENTOR(S) : Yoshio Tsukamoto and Akira Kurachi

It is certified that error appears in the above-identified patent and that said Letters Patent is hereby corrected as shown below:

Claim 1, line 2, "while" should read --white--

Signed and Sealed this

Fifteenth Day of May, 2001

Attest:

NICHOLAS P. GODICI

Attesting Officer

Acting Director of the United States Patent and Trademark Office